Jan. 14, 1930.                    H. E. SIPE                    1,743,493
                         KNOB, HANDLE, AND THE LIKE
                            Filed Jan. 30, 1928
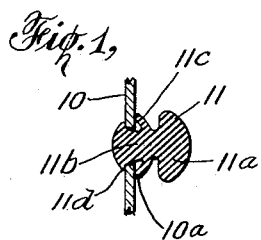
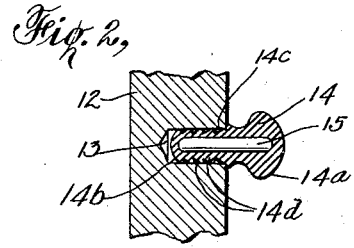
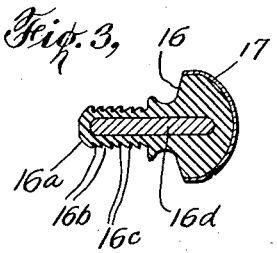
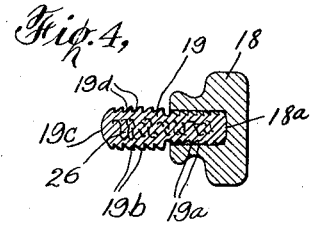
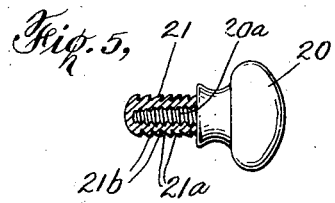
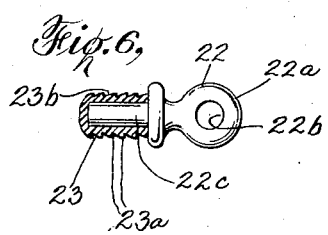
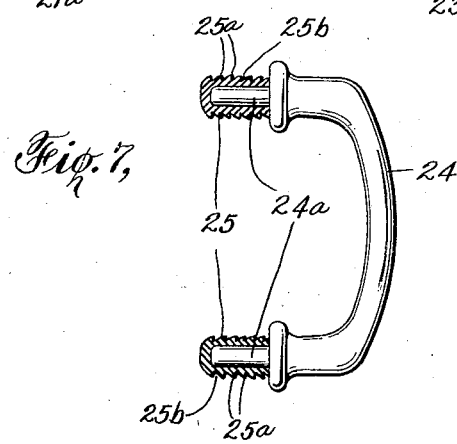
INVENTOR
Harry E. Sipe
BY
ATTORNEY Patented Jan. 14, 1930

1,743,493

UNITED STATES PATENT OFFICE

HARRY E. SIPE, OF NEW YORK, N. Y.

KNOB, HANDLE, AND THE LIKE

Application filed January 30, 1928. Serial No. 250,423.

This invention relates to knobs, handles and similar types of devices used as handle members or in coupling suitable bodies to supports of various kinds and classes and for the other uses of devices of this class, and particularly to a novel means of attaching and coupling such devices in connection with a support; and the object of the invention is to provide devices of the class specified with coupling means consisting of or involving a body of rubber or composition rubber, the outer surface of which is preferably recessed or otherwise fashioned to form projecting flexible members or recessed in such manner as to permit of the flexing of the body of rubber when inserted into or through an aperture in a support, and the flexed members or body portion serving to fixedly retain the device against displacement from the support; a further object being to provide devices of the class described which may consist entirely of a body of rubber or composition including rubber, or to such a body which may be faced by a metallic or other rigid body, and still further to a rubber body which may be reinforced by a substantially rigid or non-yielding member, and still further to a rubber body of the class described which may constitute simply a coupling or mounting member for securing a predetermined device in connection with a suitable support; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a cross sectional view of one form of device which I employ, illustrating the manner of mounting the same in connection with a support.

Fig. 2 is a similar view of another form of device.

Fig. 3 is a cross sectional view of another form of device, detached; and,

Figs. 4, 5, 6 and 7 are views similar to Fig. 3 but showing other modifications.

Heretofore, it has been customary to mount knobs, handle members, eyes and similar types of devices in connection with a support by the use of nails, screws, bolts and the like, and it is commonly experienced that in all the present methods of attachment or mounting, the knobs or other devices become loosened from the supports, when subjected to stress and strain, and become lost, broken and in general are of more or less nuisance. My invention is designed to and consists in producing a new type of device of this class as well as a new method of mounting devices of conventional or standard construction in connection with their supports.

In Fig. 1 of the accompanying drawing, I have shown one method of carrying my invention into effect. In said figure 10 represents a panel or other support which may be a thin body of wood or sheet metal or any other suitable material; 11 represents a knoblike body which may constitute a handle member, a bumper or an attaching member for coupling body parts with the support 10, the member 11 consisting of a semi-spherical, dome-shaped head 11$^a$ having a shank portion 11$^b$ provided with a curved or arc-shaped circumferential collar 11$^c$ centrally thereof. The inner end of the shank is enlarged or provided with an annular flange 11$^d$ which is adapted to be forced through an aperture 10$^a$ in the support 10, being compressed in this operation, and the shank 11$^b$ is forced inwardly to such an extent and under the compression and flexing of the collar 11$^c$, as to permit of the expansion of the flange 11$^d$, after which the device as a whole will flex and the same will be retained in connection with the support, by the action of the flange 11$^d$ and the collar 11$^c$ upon opposite side faces of the support 10. The removal of the device 11 will be prevented by the flange 11$^d$.

It will be understood that the device 11 may constitute a handle member, a bumper or any of the other devices hereinbefore named, and may be entirely composed of rubber or a suitable composition, and may also include reinforcing elements such as illustrated in the other forms of construction shown.

In Fig. 2, 12 represents a support of any kind or class in which is formed a bore, socket or recess 13. This support is of the general character in connection with which the devices shown in Figs. 3 to 7 inclusive and similar types of devices are adapted to be mounted. The devices are shown detached in the latter named figures. In Fig. 2, I have shown another form of knob, bumper or like device 14 consisting of a body of rubber or composition rubber having an outer head portion $14^a$ and a shank portion $14^b$ having recesses $14^c$ spaced thereon to form on said shank, adjacent the recess, members $14^d$ which are adapted to flex outwardly in placing the shank $14^b$ in the aperture or bore 13 of the support 12. The recesses permit of the flexing of said shank or the members or portions $14^d$ thereon. In this construction, a reinforcing member 15 is preferably imbedded in both the head and shank portions to give a certain amount of rigidity to said body and to render the entire device strong and durable, as well as presenting the yielding and resilient properties, by virtue of the rubber body from which the device is constructed.

In mounting the member 14 in connection with the support 12, a suitable cement may be used upon the shank if desired to aid in inserting the shank into the bore 13, and also to more securely retain the same therein. In many instances, a rubber or yielding cement is preferably employed. However, the use of a cement is not necessary except in some specific cases. It will be understood that the diameter of the shank or at least that part of the shank where the members $14^d$ are arranged thereon, is of greater dimensions than the diameter of the bore or aperture 13. Thus, said members must be flexed and placed under compression in inserting the shank $14^b$ into said bore, and in flexing outwardly, the possibility of removing the member 14 is rendered practically impossible unless sufficient force or pressure is exerted to absolutely destroy the body 14.

The above specific description with reference to the manner of mounting the member in connection with the support, such as 12 in Fig. 2, applies to all of the other figures, and this manner of coupling will not be repeated. But, it is also pointed out at this time, that the recesses $14^c$ forming the flexing members or portions $14^d$ may be spaced longitudinally as well as circumferentially of the shank or may be annular spaces or recesses forming annular ribs of the member $14^d$, thus being placed longitudinally and not circumferentially. Either or both forms of the construction described may be employed.

It is also to be borne in mind that the nature of the support is really immaterial, as the knobs or other devices may be mounted in wood, glass, metal, bakelite, hard rubber and other materials of any kind or class, and as will appear, the knob or other member or device may be constructed in part of material of any kind or class. For example, in Fig. 3, a rubber or composition body 16 may have a metallic or other cap or facing portion 17. In Fig. 4, a knob-like body 18 may be composed of wood, glass, metal or like material having a coupling member or body 19 of rubber or the like. In Fig. 5, a knob body 20 of any suitable material having an integral roughened or threaded shank $20^a$ may be employed, and in this construction a cap or sleeve-like coupling 21 of rubber is employed. In Fig. 6, the body 22 is substantially similar to the body 20, except that the head $22^a$ thereof is in the form of an eye having an aperture $22^b$ and the shank $22^c$ is plain and provided with a cap or sleeve 23 similar to the cap 21. In Fig. 7, I have shown a yoke-shaped handle member or other device 24 composed of any suitable material having two shanks or trunnions $24^a$ with caps or sleeves 25 similar to the caps 21 and 23.

In Fig. 3 of the drawing, the member 16 is substantially similar to the member 14 having a shank portion $16^a$, with recesses $16^b$ spaced thereon, forming flexing members or portions $16^c$ and a reinforcing member $16^d$ is mounted in the shank and extends into the head of the member 16. In this construction, the cap 17 merely forms a facing or finishing member which may be of sheet metal or of other substantially rigid material, and may in fact, consist of a coating of any kind or class, which may be applied by dipping or with a brush, to give any desired ornamental or other attractive appearance to the head of the member 16 in producing knobs, handle members or other devices of this class which may have many uses.

In Fig. 4, the body 18, which, as described, may be of any suitable material, has a bore or recess $18^a$ on its inner face, and the coupling member 19 of rubber or similar material, is provided with members $19^a$ which flex outwardly with respect to the bore $18^a$ in the construction shown in the same manner as the mounting of the member 14 in the support 12, said members being arranged in a direction opposite to corresponding members $19^b$ arranged on the outer or shank end portion $19^c$ of the member 19. The members $19^b$ flex outwardly with respect to the bore or aperture in connection with which the same is mounted. The shank $19^c$ is provided with recesses $19^d$ adjacent the members $19^b$. In this construction, it will be understood that that part of the member 19 within the body 18 may be made plain and secured in position by a suitable cement or by vulcanization, depending upon the nature of the body 18 employed.

In Fig. 5 of the drawing, the member 20 with its part 20ª, may be composed of a single material, such as an all metal or all wood body, and on the other hand may consist of two different materials, the members 20ª being coupled with or secured to the member 20. In this form of construction a cup-shaped or thimble-shaped body 21 of rubber is mounted upon the shank 20ª which in the construction shown is threaded and is secured to said shank in any desired manner. The outer face of the cap 21 is provided with spaced recesses 21ª forming corresponding members 21ᵇ which flex and are placed under compression, the same as the members 14ᵈ.

The brief description with regard to the members 20—20ª, Fig. 5, will apply to the members 22—22ᶜ, Fig. 6, and also to the members 23 substituted for the member 21, the latter having projecting members 23ª adjacent which are recesses 23ᵇ. This also applies to the structure shown in Fig. 7, and in the latter figure, each of the caps 25 is provided with projecting members 25ª and corresponding recesses 25ᵇ.

In connection with the structure shown in Fig. 7 I wish to add that my invention is not limited to any particular shape or contour of the part 24. The principle which I wish to broadly convey in this figure, is that my invention may be applied to devices having two or more arms or parts to be attached to a support. For example, a three legged or four legged body may be coupled to a suitable support and retained in position on said support by the use of my improved resilient coupling and mounting members.

It is also to be noted that in the several forms of construction shown, the common feature which exists, resides in the provision of a secure mounting member or part which will also provide a yielding, cushioning and resilient mounting for the device or member in connection with the support, thus compensating for shocks and strains, as well as vibratory actions to which the support and/or the device may be subjected. It will also be apparent that the devices may be composed of rubber or composition rubber of any kind or class and reinforced and strengthened in any desired manner. For example, the bodies may contain fibrous or other strands molded therein as at 26 in Fig. 4 of the drawing.

It will be understood that while I have shown certain details of construction for carrying my invention into effect, and have described certain types of devices or body members in connection with which my invention may be employed, that I am not necessarily limited in these respects and various changes in and modifications of the construction herein shown and described may be made within the scope of the appended claims, without departing from the spirit of the invention or sacrificing its advantages.

Having fully described my invention, what I claim as new and desire to secure by Letters Patent, is:

1. The herein described means for mounting a device in connection with a support having a socket, said means comprising a resilient body constituting part of said device and a non-resilient core for said body, said resilient body being adapted to be placed under compression in insertion into the socket of said support in securing the device thereto, and the periphery of said resilient body having recessed portions whereby adjacent portions of the body are capable of outward flexing in the operation of placing the same in said socket.

2. In a knob, handle and like device including a rigid shank portion, a body of resilient material arranged on said shank portion for mounting said device in connection with a suitable support, said body having portions adapted to flex and to be placed under compression in securing the device to said support and in preventing displacement of said device.

3. The herein described means of mounting a device in connection with a support having a socket, said device including a part adapted to be arranged outwardly of the support having the socket and a pin-like member of rigid material adapted to be inserted into said socket and said pin member including a coupling body involving a plurality of resilient members arranged and spaced longitudinally thereof whereby in inserting the pin member and said resilient members in the socket, said resilient members are flexed and placed under compression resisted by the rigid pin member to securely retain the device against displacement from the support.

4. A device of the class described having a projecting pin-like member of rigid material and a coupling body of resilient material arranged longitudinally throughout the length of said member and including longitudinally spaced projecting portions whereby in inserting said member with the resilient body thereon into a socket in a support in connection with which the device is to be secured, said projecting members are flexed and placed under compression, which compression is resisted by the rigid pin member which forms a supporting body for said resilient body in securing the device in and to the support.

In testimony that I claim the foregoing as my invention I have signed my name this 23rd day of January 1928.

HARRY E. SIPE.